United States Patent Office 3,066,060
Patented Nov. 27, 1962

3,066,060
IMPROVED PHENOLIC RESIN/SYNTHETIC ELASTOMER ADHESIVE FOR STRUCTURAL METALLIC MEMBERS
Malcolm E. Gross, Akron, Ohio, assignor to The B. F. Goodrich Company, New York, N.Y., a corporation of New York
No Drawing. Filed Dec. 5, 1958, Ser. No. 778,327
13 Claims. (Cl. 154—43)

This invention relates to improved bonding of metallic structural materials and to improved adhesive systems for bonding such materials. More particularly it relates to the employment of a silylamine combined with phenolic resin/synthetic elastomer adhesive systems whereby the bonding strength of the adhesive is increased, particularly at elevated temperatures, and the life of the bond is vastly lengthened by avoidance of corrosion in the metal part of the structure.

Adhesive joints are frequently replacing riveted and welded joints because they are lighter, stronger and more streamlined. A single layer of adhesive 0.005 inch to 0.015 inch thick will serve to bond metal to metal with greater strength than rivets or welding can provide. Further improvement in strength of these joints is still needed, however, both in ageing and in service over the wide range of temperatures from sub-freezing to 400° F. and above.

Presently known adhesive systems will bond aluminum to aluminum with tensile-shear strengths in excess of 4,000 p.s.i. at room temperatures and the bonds generally have good ageing properties but failure due to corrosion of the metal at the bond is all too frequent. With other structural members made of metals, particularly magnesium and stainless steel, corrosion of the metal sections is a prevalent and serious problem. This corrosion is believed to be caused both by decomposition of the adhesive, resulting in chemical attack on the metal, and by straight attack of the metal by the elements such as salt spray.

An object of this invention is to provide new, improved, thermosetting adhesives for joining the structural metals useful in laminating and in building construction. Another object is to provide adhesives for joining aluminum, magnesium, stainless steel, titanium, beryllium, iron, copper and their alloys to themselves or to each other with an adhesive bond that will not deteriorate at high temperatures or contribute to the corrosion of the metals being joined. Yet another object is to provide an improved adhesive, particularly an adhesive in a flexible sheet, film or tape form that will maintain a high bond strength to metal even at temperatures as high as 400° F. and above.

I have now discovered that the combination of a reactive silylamine with certain known adhesives can be used to bond metals and their alloys to themselves and to each other to form joints that have great strength, that do not chemically decompose, and that do not significantly corrode the metals being joined even at high temperatures. The silylamine may be added to the adhesive and spread upon the metal surfaces with it in one application, or it may be coated, sprayed, brushed or dipped on the clean metal as a primer or wash coat before the adhesive is applied to the metal surfaces, or when the adhesive is in the form known as tape or film, the silylamine may be applied to the adhesive tape by a dip or brush coat and the treated tape then adhered to the metal to make the joint. Any and all of these combinations are about equally effective.

In addition to serving as a bond between two or more opposed metal surfaces, the adhesive employed in the practice of my invention may itself serve as a laminating or coating layer on a single metal surface. Such coated metals can be fabricated as tanks or containers or may be used in any structure where resistance to acidic solutions or weathering is particularly important.

A broad class of adhesives that has become very useful in bonding aluminum, magnesium, stainless steels, low carbon steels, thorium, similar metals and their alloys is the phenolic resin/synthetic elastomer group. As used herein, the term "elastomer" is intended to include all substances having the properties of natural, reclaim, vulcanized or synthetic rubber. These adhesives usually combine a single phenol-aldehyde resin and a single synthetic elastomer although combinations of resins and elastomers are often found adequate for special purposes. Adhesives of this type are usually cured by application of heat and pressure for 15–60 minutes at 350° F. and 150 p.s.i., or equivalent conditions.

The preferred phenolic resins are the type that is capable of being converted by heat to a permanently infusible state in the presence of formaldehyde or a methylene-yielding curing agent of the type commonly used for curing phenolic resins, such as hexamethylene-tetraamine or para-formaldehyde. These phenolic resins are of the novolac type which are made by limited condensation of phenol with formaldehyde, usually in the presence of an acid catalyst, the ratio of phenol to formaldehyde being maintained at greater than a molar equivalent amount, preferably 1.25:1.0 and ranging from 1.1:1.0 to 1.4:1.0, so that the formaldehyde reacts to form essentially only linear polymer chains with the phenol, there being insufficient formaldehyde to form cross-links between the polymer chains. Novolac resins are insoluble in water and do not harden when heated unless additional curing agent, such as more formaldehyde, is present. The phenolic resin may be one that has been modified with cashew nut shell oil.

Phenols generally used are phenol, xylenol and cresol; any of the aromatic hydroxyl series consisting of carbon, hydrogen, and oxygen may be used. The aldehyde may be any active aldehyde which forms a resinous thermosetting condensation product. The aldehydes which are free of phenyl or other aromatic groups and consist solely of carbon, hydrogen and oxygen are preferably used. Typical aliphatic aldehydes which can be used are formaldehyde, acetaldehyde and butyraldehyde. A representative heterocyclic aldehyde is furfuraldehyde.

The synthetic elastomer components of these adhesive systems are usually prepared by known aqueous emulsion, or solvent suspension techniques. They may consist of any of (a) polybutadiene, butadiene-styrene, butadiene-acrylonitrile, and butadiene-alkyl acrylate copolymers, (b) reaction products of alkaline metal polysulfides and dihalide, (c) polychloroprene, (d) polyisobutylene, (e) polyvinyl chloride, polyvinylidene chloride, and (f) mixtures of these polymers and other polymerized unsaturated materials containing a terminal $CH_2=C<$ group which undergo aqueous emulsion polymerization to yield a product having the properties of natural or synthetic rubber.

The most preferred elastomers are rubbery butadiene-acrylonitrile copolymers prepared in aqueous emulsion which preferably contain about 33%–44% bound acrylonitrile and have a Mooney viscosity of 70–80 (large rotor). The phenolic resin/nitrile rubber adhesives whose strength and durability properties I improve by the combination with the reactive silylamine are used to bond and coat inflexible materials such as rigid metal plates, slightly flexible materials such as thin metal sheets and completely flexible materials such as metal foils. They are often employed in the form of a calendered tape which is placed between the metal surfaces to be bonded or in contact with the single metal surface to be coated. By application of heat and pressure to the assembly in an oven or in a press, the adhesive is cured, giving a strong bond. When a single metal surface is to be coated with the adhesive, the adhesive surface opposite the metal surface is covered with a non-adherent film such as cellophane to prevent the adhesive from sticking to the platens of the press during cure. After the cure is complete and the cellophane film is removed, the exposed surface of the adhesive will be non-tacky. Adhesives of this type can also be dispersed in suitable organic solvents, applied by brushing or dipping and dried in air at room temperature or by forced drying with infrared or other suitable source of heat. After these cements are dry they can be cured by heat and pressure as in a press. When these adhesives are applied as a laminate coat to the metal piece, said metal piece is much improved in resistance to weathering and to acidic materials.

These adhesives are prepared by mixing resin, rubber, and rubber compounds by a fairly rigorous procedure. Thermo-setting phenol-aldehyde resins of the novolac type are widely available in the market as are butadiene: acrylonitrile copolymer synthetic rubbers high in nitrile content. Semi-reinforcing carbon blacks have proved to be the best reinforcing fillers. Other rubber compounding pigments such as sulfur, zinc oxide, mercaptobenzothiazole and stearic acid are used as obtained from any reputable rubber chemicals manufacturer or supplier. The rubber:resin ratio may vary from 100:80 parts to 100:500 parts and compounding ingredients are added proportionately.

A typical recipe for a phenolic resin/nitrile rubber adhesive batch is:

| | |
|---|---|
| Butadiene/acrylonitrile copolymer | 100 |
| Carbon black | 20 |
| Zinc oxide | 5 |
| 2 mercaptobenzothiazole | 1 |
| Sulfur, rubber maker's | 1 |
| Stearic acid | 0.5 |
| Phenol/formaldehyde resin | 150 |
| | 277.5 |

The nitrile rubber desirably has a Mooney viscosity of 70–80. If the original Mooney viscosity is too high, it can be reduced to the 70–80 range by milling the stock on a cold, standard rubber mill. Monney viscosity is determined by ASTM Method D–927–49T. The values taken are 4 minute readings at 212° F. (large rotor).

The carbon black is added to the rubber on the mill as quickly as possible, after which the stock is cross-blended, until a uniform mix is obtained. Cooling water is run through the mill rolls to keep surface temperatures below 190° F.

Next the zinc oxide, mercaptobenzothiazole, sulfur and stearic acid, previously mixed together, are added in the same manner as the carbon black. Again the stock is cross-blended, keeping the temperature below 190° F. When mixing is complete, the mill rolls are opened until the bank practically disappears.

The phenolic resin is added as rapidly as possible, and the mill rolls are gradually opened to keep the bank small and force the powder to be absorbed quickly.

With no further change in the mill setting, the stock is warmed by doubling and redoubling and passing through the mill several times. The mill is set compartively tight and the mix is blended further; then the stock is banked on the front roll. The stock is cut and cross-blended at a temperature below 190° F., then the batch is allowed to run till the temperature rises to 200° F. At this time the resin will melt and the stock will soften and should be removed from the mill. With the mill set very tight, the warm stock is sheeted and laid out to cool.

Other representative types of adhesives which are improved by combination with a silylamine as taught by my invention include epoxy, phenolic resin/polyvinylformal resin combinations and modified chlorinated rubbers.

Improvement in these adhesives, however, as compared to the phenolic resin/synthetic elastomer type, is mostly at low temperatures in the neighborhood of room temperature.

The reactive silylamines which I find valuable in the practice of this invention are selected from the class which has the formula

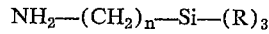

$$NH_2-(CH_2)_n-Si-(R)_3$$

wherein $n$ is a whole number from 1 to 5, and R is an alkyl or alkoxy group having from 1 to 4 carbon atoms inclusive or a monocyclic aryl hydrocarbon. Said R groups may be the same or different in any combination of three of the aforesaid groups. Representative compounds of this class include trimethylsilylethyl amine, triethoxysilylpropyl amine, trimethylsilylbutyl amine, tributoxysilylmethyl amine, trimethylsilylpropyl amine, methyldiethoxysilylbutyl amine, dimethylpropoxysilylpropyl amine, trimethylsilylpentyl amine, diphenylmethylsilylmethyl amine and the like. The most preferred of these silyl amines are the alkoxysilylpropyl amines which have the empirical formula

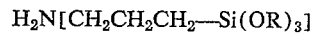

$$H_2N[CH_2CH_2CH_2-Si(OR)_3]$$

where R is an alkyl group such as methyl, ethyl, propyl and the like. These preferred silyl amines are prepared by the reaction of a gamma-chloropropylalkoxysilane with ammonia under pressure at elevated temperatures as described in U.S. Patent No. 2,832,754. In addition to the monoamines, as illustrated by the formula, bis- and tris-amines can be made similarly, and will serve the purposes of my invention.

Other silylamines useful in the practice of this invention may be made by reaction of the proper halomethylsilane ($R_3SiCH_2X$) and ammonia where X is chlorine or bromine and $R_3$ may be any combination of alkyl, aryl or alkoxy groups as shown by Noll et al., "Journal American Chemical Society," vol. 73 (1951), pp 3867–3871, and from trimethylchlorosilane by a Grignard reaction, malonic ester synthesis and further steps as described by Sommer et al., "Journal American Chemical Society," vol. 73 (1951), pp. 5130–5134.

In the practice of this invention, silylmethyl amines must be handled under anhydrous conditions, else they tend to cleave at the carbon to silicon bond yielding an inactive precipitate which is largely silica. These materials can safely be handled in anhydrous alcohol solutions, for intance, or in organic solvents such as heptane.

Only a small amount of the silylamine is needed to give the improved results afforded by the new adhesive combination of my invention. When the silylamine is first coated on either the base adhesive or on the metal to be bonded, a single brush coat or dip coat deposits an effective amount. When the silylamine is added directly to the adhesive as it is prepared, from 0.01 to 2.0 parts per 100 parts of resin/elastomer adhesive are used with 1.0 part being generally preferred.

Adhesive joints in the examples to follow were evaluated by a lap-shear test and a T-peel test. In the shear test metal panels 4″ x 7″ x .064″ are cleaned and pickled by various procedures according to the type of metal. They then may be coated with the silylamine. The adhesive is applied in tape form or by brush coating so as to be preperably .005″ to .015″ thick, and two panels are assembled to form an overlap joint ½″ by 7″. The adhesive is cured by heating the panels under pressure in an electrically heated platen press. Pressures of 100 p.s.i. are usually employed. The cured, bonded assembly is sawed into 1″ wide strips which are tested in shear at various temperatures in a Baldwin Tate-Emery test machine equipped with self-aligning Templin-type grips enclosed in an insulated cabinet which can be heated or cooled. Each test strip has a bonded area of 0.5 sq. in., hence, shear strength for the joint is twice the load required to break the joint.

In the T-peel test 3" x 10" x 0.032" 2024T3 aluminum clad panels are cleaned and pickled by degreasing in liquid and vapor trichloroethylene, holding 10 minutes at 75° C. in a bath consisting of 10 parts concentrated sulfuric acid, 4 parts sodium dichromate and 30 parts distilled water, rinsing in tap and then distilled water, and finally oven drying for 30 minutes at 75° C. If a silylamine coating is to be given to the metal, it is applied in the form of a single brush coat, air dried for 5 minutes, and oven dried for 15 minutes at 75° C. Two panels are then assembled with a single layer of the adhesive .005 to .015 inch thick over an area 3" x 8", leaving a 3" x 2" area unadhered to provide a clamping area for the jaws of the test machine. The assembly is cured in a press, usually for 60 minutes at 350° F and 100 p.s.i. The 3" x 10" bonded sheets are now sawed into 1" x 10" strips and the two inch unadhered ends are bent at right angles to the bonded strip, thereby forming a T-shaped assembly. The ears thus formed are locked in Templin-type jaws in a Baldwin Tate-Emery machine which pulls the strips apart at the rate of 10" per minute with the pounds pull per inch being recorded on an autographic recorder. In addition to the numerical value of pounds pull per inch required to tear the two metal strips apart, the type of bond failure is noted. Cohesive failure where the strips are torn through the adhesive is desired. Adhesive failure wherein the adhesive separates cleanly from one metal strip or the other is very undesirable.

EXAMPLE 1

A phenol-formaldehyde resin/nitrile rubber adhesive was prepared in tape form as described above. Strips of magnesium-thorium alloy (HK–31) were cleaned by degreasing in liquid and vapor trichloroethylene, holding 10 minutes at 80°–85°C. In an alkaline detergent bath, holding 10 minutes in a chromic acid bath at 65° C. and rinsing in distilled water.

Triethoxysilylpropyl amine in the form of a 1% solution by weight in 95% ethanol-5% water was brushed on the metal surfaces to be joined in a single coat, air-dried 5 minutes, and oven dried 25 minutes at 75° C. A single layer of the dry, sheeted adhesive tape was inserted between the aloy surfaces to be bonded, the joint was clamped under 100 p.s.i. pressure and cured 60 minutes at 350° F. At this stage the silylamine and the adhesive are believed to be combined. Some of the test panels were given a post or after cure of 60' at 450° F. followed by 60' at 500° F. as indicated in Table 1. The use of post cures gives improved shear strengths over the results from single cures in the higher range of temperatures from 350°F up. Table 1 shows the shear strength of the joints as determined by the lap shear test. No untreated alloy strips were used because it is well known that magnesium and its alloys can not be bonded unless the metal is primed manually, chemically, or electrolytically in some manner.

*Table 1*

| Post cure | Test temp., ° F. | Shear p.s.i. |
|---|---|---|
| None | −67 | 2,875 |
| Yes | −67 | 3,220 |
| None | 77 | 3,380 |
| Yes | 77 | 2,790 |
| None | 300 | 1,965 |
| Yes | 300 | 1,700 |
| Yes | 500 | 1,095 |
| Aged 8 days at 500° F | 500 | 950 |

No joint showed any darkening of the surface due to corrosion, nor was there any evidence of bond deterioration.

The same phenolic resin/nitrile rubber adhesive was used to bond stainless steel alloy type 301, condition ½-hard which was prepared as follows: degreased in liquid and vapor trichloroethylene, held 10 minutes at 80°–85° C. in an alkaline detergent cleaning bath, rinsed in tap water, immersed 20 seconds in 5% hydrochloric acid (to depassify the surface), held 10 minutes at 65°–70° C. in a 12% by weight sulfuric acid solution, "brightened" by a 10 minute pickle at room temperature in a bath comprising 14.5% nitric acid, 2% hydrofluoric acid, and 83.5% water, rinsed in tap water and distilled water and dried.

Triethoxysilylpropyl amine (1% solution in 95% ethanol—5% water) was brushed on the surfaces to be bonded in a single coat, air-dried 5 minutes, and over-dried 15 minutes at 75° C.

A single layer of the dry, sheeted, adhesive tape was inserted between the surfaces to be bonded, the joint was clamped under 100 p.s.i. pressure and cured 60 minutes at 350° F. All specimens were given a double post cure by first curing 60' at 450° F., then giving a second post cure as indicated in Table 2. Shear was determined by the lap shear test.

*Table 2*

| Final post cure | Test temp., ° F. | Shear (p.s.i.) |
|---|---|---|
| 60' at 500° F | −67 | 5,500 |
| Do | 77 | 4,030 |
| Do | 300 | 2,010 |
| Do | 500 | 1,210 |
| Do | 600 | 530 |
| 120' at 500° F | 77 | 3,910 |
| Do | 500 | 1,230 |
| Do | 600 | 715 |
| 180' at 500° F | 77 | 4,310 |
| Do | 300 | 2,340 |
| Do | 500 | 1,470 |
| Do | 600 | 665 |
| 240' at 500° F | 77 | 3,010 |
| Do | 300 | 2,130 |
| Do | 500 | 1,380 |
| Do | 600 | 570 |
| 2 days at 500° F | 500 | 1,640 |
| 4 days at 500° F | 500 | 1,917 |
| 8 days at 500° F | 300 | 2,760 |
| Do | 500 | 2,100 |

A control joint in which no silylamine was employed gave a shear strength of only 80 p.s.i. after 8 days' aging at 500° F. The remarkable property of the adhesive combination of the invention is that it is very strong after long aging at high temperatures.

EXAMPLE 2

A batch of phenolic resin/nitrile rubber adhesive was prepared as described above. After the rubber and resin were blended, on part of triethoxysilylpropyl amine was added to the batch on the mill.

Aluminum test strips were used in the lap shear test with results as shown in Table 3. A primer coat of triethoxysilylpropyl amine was also applied to the aluminum strips in some cases in the manner described in Example 1.

*Table 3*

| Primer on metal | Test temp., ° F. | Shear, p.s.i. (avg. of 4) |
|---|---|---|
| None | −67 | 2,420 |
| Silylamine | −67 | 2,537 |
| None | R.T. | 3,507 |
| Silylamine | R.T. | 3,732 |
| None | 300 | 1,415 |
| Silylamine | 300 | 1,957 |

These results indicate that the adhesive combination of silylamine and phenolic resin/nitrile rubber elastomer gives good adhesion through a wide temperature range when the silylamine is mixed directly into the primary adhesive and slightly better results when the silylamine is also combined with the primary adhesive as a primer coat on the metal surface to be bonded.

EXAMPLE 3

The phenolic resin/nitrile rubber adhesive of Example 1 was again employed. Triethoxysilylpropyl amine was prepared as a 0.5% solution by weight in heptane. A length of the calendered adhesive tape was passed through the silylamine solution and hung up to dry for 1 hour. T-peel and lap-shear tests were then run on aluminum sheets bonded with the dipped adhesive with the results shown in Tables 4 and 5. The T-peel tests gave 100% cohesion failure at 30 lbs./inch. This is very good. Strips using adhesive aged 1, 2, 3, 6, and 8 weeks at 40° F. gave similar results. In the lap-shear test, all specimens were cured 60' at 350° F.

*Table 4*

T. PEEL TEST

| Treatment on metal | Age of adhesive | Adhesion lbs./inch | Appearance |
|---|---|---|---|
| Triethoxysilylpropyl amine | Fresh | 30 | 100% cohesion. |
| Do | 1 wk | 30 | Do. |
| Do | 2 wks | 30 | Do. |
| Do | 3 wks | 30 | Do. |
| Do | 6 wks | 30 | Do. |
| Do | 8 wks | 30 | Do. |

*Table 5*

LAP-SHEAR TEST

| Silylamine treatment | Test temp., ° F. | Shear, lbs./sq. in. |
|---|---|---|
| None (control) | −67 | 2,852 |
| On metal | −67 | 3,122 |
| None (control) | R.T. | 3,685 |
| On tape | R.T. | 3,815A |
| On metal | R.T. | 3,800 |
| On both | R.T. | 4,060A |
| None (control) | 300 | 2,355 |
| On tape | 300 | 2,332A |
| On metal | 300 | 2,387 |
| On both | 300 | 2,377A |

NOTE.—A indicates that the treated tape was aged 3 weeks at 40° F. (ordinary refrigerator) before the joint was made and shows that the improved adhesive can easily be stored as in a factory inventory before use without deterioration.

EXAMPLE 4

Aluminum test strips, type clad 2024T3 were cleaned as described above, coated with triethoxysilylpropyl amine, plied in pairs with a single layer of phenolic resin/nitrile rubber adhesive as described in the lap-shear test above, and cured for 60 minutes at 350° F. under varying bonding pressures. One-third of the strips were maintained as controls; the remainder were subjected to salt spray in a laboratory cabinet for 30 days. At the end of this time the strips were tested for shear strength. After separation of the strips a visual estimate was made of the originally bonded area which showed evidence of corrosion.

*Table 6*

| Salt spray | Silyl amine | Bond pressure (p.s.i.) | Shear (Avg.) | Percent corrosion |
|---|---|---|---|---|
| No | Yes | 45 | 4,333 | None. |
| Yes | Yes | 45 | 4,205 | 11 strips intact, 1 strip 30% corroded. |
| No | No | 45 | 3,890 | None. |
| Yes | No | 45 | 150–3,180 | 1 strip intact, 11 strips 10–100% corroded. |
| No | Yes | 150 | 3,950 | None. |
| Yes | Yes | 150 | 3,935 | 9 strips intact, 3 strips 10% corroded. |
| No | No | 150 | 3,910 | None. |
| Yes | No | 150 | 2,885 | 2 strips intact, 10 strips 10–40% corroded. |

EXAMPLE 5

The phenolic resin/nitrile rubber adhesive of Example 1 was applied in sheet form to stainless steel alloy 17–7 strips primed as in Example 1 with triethoxysilylpropyl amine. The metal strips were first cleaned by 60 minute immersion at 170° F. in a 10% caustic (sodium hydroxide) bath, 6 minutes' pickling in a 12% sulfuric acid "etch" bath, 10 minutes at room temperature in a "brightener" bath of nitric and hydrofluoric acids, tap and distilled water rinse, and drying.

Metal strips were assembled with a single layer of tape adhesive between them, and cured 60 minutes at 350° F. and 100 p.s.i. bonding pressure. A circulating air oven was used for a double post cure cycle of 60 minutes at 450° F. followed by 60 minutes at 500° F. Lap-shear results on the joints are given below:

*Table 7*

| Test temperature, ° F. | Shear (p.s.i.) |
|---|---|
| −67 | High 6,800, low 3,640, avg. 5,340. |
| RT | High 4,920, low 3,860, avg. 4,500. |
| 300 | High 3,630, low 2,260, avg. 2,912. |
| 500 | High 2,100, low 1,080, avg. 1,660. |
| 600 | High 1,900, low 240, avg. 490. |
| Aged 8 days at 500° F | High 2,400, low 1,870, avg. 2,073. |

Again it is remarkable to note the great strength of the joint after extended ageing.

EXAMPLE 6

A low carbon steel plate 6 inches by 3 inches by ¼ inch was cleaned by blasting with steel grit and given a single brush coat of triethoxypropylsilyl amine on one of the 6″ x 3″ surfaces. To this primed surface a strip of the phenolic resin/nitrile rubber adhesive of Example 1 was applied and the structure was cured in a press for 60 minutes at 350° F. and 100 p.s.i. bonding pressure using a film of cellophane to prevent adhesion of the adhesive to the platen of the press. The coated side of the panel was extremely resistant to acidic solutions and salt spray while the unprotected side quickly showed rust, pitting and corrosion under the same conditions. The improved adhesives of this invention can be used as coatings or linings for tanks, containers and other vessels.

EXAMPLE 7

A T-peel test was run on aluminum strips cleaned and pickled in the regular manner. Different silane materials were applied to the metal as a single brush coat, air dried 5 minutes and oven dried 15 minutes at 75° C. The joints were assembled with phenolic resin/nitrile rubber tape adhesive and cured in a press heated from ambient temperature to 350° F. in about 30 minutes, then held 60 minutes at 350° F. Bonding pressure was 100 p.s.i. Results are given in Table 8.

*Table 8*

| Silane compound | Adhesion lbs./in. | Appearance |
|---|---|---|
| None | 8 | Adhesion failure. |
| Triethoxysilylpropylamine | 30 | 100% cohesion. |
| Diethoxymethylsilylbutylamine | 29 | Do. |
| Triethoxybetacarbethoxyethyl silane | 12 | Mainly adhesion. |

The reactive amino group appears to contribute largely to the success of the adhesive combination.

EXAMPLE 8

In the ASTM button test number D–429–56T, Method A, which evaluates rubber to metal adhesion, several sets of test buttons were prepared to determine if combining silylamines with other adhesives would improve the performance of the adhesives. A compounded natural rubber stock was used as the center of the button sandwich construction.

*Table 9*

| Type of adhesive | Silylamine | Pull lbs./sq. in. | Type of failure |
|---|---|---|---|
| Modified chlorinated rubber. | On the metal. | 1,200 (avg., of 7). | 100% in the rubber |
| Do | none | 770 (5) | 80% adhesion at metal, 20% in rubber. |

The strength of the bond was improved considerably and change in type of failure from 80% adhesion to 100% cohesion is exceptional.

These examples have illustrated the operation of my invention. Its scope is to be determined only by the following claims.

The embodiments of the invention in which an exclusive property or privilege is claimed are defined as follows.

I claim:

1. A cleaned and pickled metal surface said metal being selected from the group consisting of aluminum, magnesium, low carbon steel, stainless steel, thorium and beryllium, coated with an adherent layer comprising a phenolic resin/synthetic elastomer blend in the respective weight proportions of 80:100 to 500:100, said synthetic elastomer being selected from the group consisting of (a) polybutadiene, butadiene-styrene, butadiene-acrylonitrile, and butadiene-alkyl acrylate copolymers, (b) reaction products of alkaline metal polysulfides and dihalides, (c) polychloroprene, (d) polyisobutylene, (e) polyvinyl chloride, and polyvinylidene chloride, combined with 0.01 to 2.0 parts by weight of said adherent layer of a reactive silylamine selected from the group whose formula is $NH_2-(CH_2)_n-Si-(R)_3$ wherein $n$ is a whole number from 1 to 5 and each R is selected from the group consisting of alkoxy radicals containing from 1 to 4 carbon atoms.

2. A structural member having opposed cleaned and pickled metal surfaces said metal being selected from the group consisting of aluminum, magnesium, low carbon steel, stainless steel, thorium and beryllium, bonded by an adhesive combination layer comprising a phenolic resin/synthetic elastomer blend in the respective weight proportions of 80:100 to 500:100, said synthetic elastomer being selected from the group consisting of (a) polybutadiene, butadiene-styrene, butadiene-acrylonitrile, and butadiene-alkyl acrylate copolymers, (b) reaction products of alkaline metal polysulfides and dihalides, (c) polychloroprene, (d) polyisobutylene, (e) polyvinyl chloride, and polyvinylidene chloride, combined with 0.01 to 2.0 parts by weight of said adherent layer of a reactive silylamine selected from the group whose formula is $NH_2-(CH_2)_n-Si-(R)_3$ wherein $n$ is a whole number from 1 to 5 and each R is selected from the group consisting of alkoxy radicals containing from 1 to 4 carbon atoms.

3. A structural member comprising at least two pieces of cleaned and pickled metal said metal being selected from the group consisting of aluminum, magnesium, low carbon steel, stainless steel, thorium and beryllium, bonded together by an adhesive composition comprising a phenolic resin/synthetic elastomer blend in the respective weight proportions of 80:100 to 500:100, said synthetic elastomer being selected from the group consisting of (a) polybutadiene, butadiene-styrene, butadiene-acrylonitrile, and butadiene-alkyl acrylate copolymers, (b) reaction products of alkaline metal polysulfides and dihalides, (c) polychloroprene, (d) polyisobutylene, (e) polyvinyl chloride, and polyvinylidene chloride, combined with 0.01 to 2.0 parts by weight of said adherent layer of a reactive silylamine selected from the group whose formula is $NH_2-(CH_2)_n-Si-(R)_3$ where $n$ is a whole number from 1 to 5 and each R is selected from the group consisting of alkoxy radicals containing from 1 to 4 carbon atoms.

4. A structural member comprising at least two pieces of cleaned and pickled structural material selected from the group consisting of aluminum, magnesium, low carbon steel, stainless steel, thorium, and beryllium bonded by an adhesive composition comprising a phenolaldehyde resin/nitrile rubber blend, said resin and rubber being combined in the weight proportions of 80:100 to 500:100 and said blend combined with 0.01 to 2.0 parts by weight of said composition of a reactive silylamine selected from the group whose formula is $$NH_2-(CH_2)_n-Si-(R)_3$$

wherein $n$ is a whole number from 1 to 5 and each R is selected from the group consisting of alkoxy radicals containing from 1 to 4 carbon atoms, said silylamine being admixed with the adhesive.

5. A structural member comprising at least two pieces of cleaned and pickled structural material selected from the group consisting of aluminum, magnesium, low carbon steel, stainless steel, thorium, and beryllium bonded together by an adhesive combination comprising a tape of a phenol-aldehyde resin/nitrile rubber blend said resin and rubber being combined in the weight proportions of 80:100 to 500:100, said tape being coated on both surfaces with a total of 0.01 to 2.0 parts by weight of said tape of a reactive silylamine selected from the group whose formula is $$NH_2-(CH_2)_n-Si-(R)_3$$

wherein $n$ is a whole number from 1 to 5 and each R is selected from the group consisting of alkoxy radicals containing from 1 to 4 carbon atoms.

6. A structural member comprising at least two pieces of cleaned and pickled structural material selected from the group consisting of aluminum, magnesium, low carbon steel, stainless steel, thorium and beryllium, said pieces having at least two opposed surfaces, said opposed surfaces being coated with a reactive silylamine and intercalated between said silylamine coated surfaces an adhesive comprising a blend of a thermosetting phenol-aldehyde resin and a synthetic elastomer in the respective weight proportions of 80:100 to 500:100, said synthetic elastomer being selected from the group consisting of (a) polybutadiene, butadiene-styrene, butadiene-acrylonitrile, and butadiene-alkyl acrylate copolymers, (b) reaction products of alkaline metal polysulfides and dihalides, (c) polychloroprene, (d) polyisobutylene, (e) polyvinyl chloride, and polyvinylidene chloride, said silylamine being present in an amount of 0.01 to 2.0 parts by weight based on the adhesive, said silylamine having the generic structure $(NH_2)-(CH_2)_n-Si-(R)_3$ wherein $n$ is a whole number from 1 to 5, and each R is selected from the group consisting of alkoxy radicals containing from 1 to 4 carbon atoms.

7. The structural member of claim 2 wherein the silylamine is triethoxysilylpropylamine.

8. The structural member of claim 2 wherein the silylamine is diethoxymethyl silylbutylamine.

9. The method of forming a structure comprising coating at least one surface of a cleaned and pickled metal member said metail being selected from the group consisting of aluminum, magnesium, low carbon steel, stainless steel, thorium and beryllium, with a silylamine having the formula $H_2N-(CH_2)_n-Si-(R)_3$ wherein $n$ is a whole number from 1 to 5, and each R is selected from the group consisting of alkoxy radicals containing from 1 to 4 carbon atoms, then applying to said coated surfaces an adhesive and adherent coating comprising a blend of a synthetic elastomer and a thermo-setting phenol-aldehyde resin in the respective weight proportions of 100:80 to 100:500, said synthetic elastomer being selected from the group consisting of (a) polybutadiene, butadiene-styrene, butadiene-acrylonitrile, and butadiene-alkyl acrylate copolymers, (b) reaction products of alkaline metal polysulfides and dihalides, (c) polychloroprene, (d) polyisobutylene, (e) polyvinyl chloride, and polyvinylidene chloride, covering said coating with a non-adherent film, curing the structure by applying heat and pressure, and finally removing the non-adherent film.

10. The method of forming a bonded metal structural member said metail being selected from the group consisting of aluminum, magnesium, low carbon steel, stainless steel, thorium and beryllium, comprising coating opposed surfaces of at least two cleaned and pickled metal structural sections with a silylamine having the formula $H_2N-(CH_2)_n-Si-(R)_3$ wherein $n$ is a whole number from 1 to 5, and each R is selected from the group consisting of alkoxy radicals containing 1 to 4 carbon atoms, applying an adhesive comprising a blend of a synthetic elastomer and a thermosetting phenol-aldehyde resin in the weight proportions of 100:80 to 100:500 between the silylamine coated surfaces of said members, said synthetic elastomer being selected from the group consisting of (a) polybutadiene, butadiene-styrene, butadiene-acrylonitrile, and butadiene-alkyl acrylate copolymers, (b) reaction products of alkaline metal polysulfides and dihalides, (c) polychloroprene, (d) polyisobutylene, (e) polyvinyl chloride, and polyvinylidene chloride, and applying heat and pressure to the structure.

11. The method of forming a metal structural member said member consisting of at least two pieces of structural material selected from the group consisting of aluminum, magnesium, low carbon steel, stainless steel, thorium and beryllium, comprising curing a cleaned and pickled metal:phenol-aldehyde/nitrile rubber adhesive: cleaned and pickled metal sandwich under heat and pressure, said adhesive containing phenol-aldehyde resin and nitrile rubber respectively combined in the weight proportions of 80:100 to 500:100, said adhesive containing from 0.01 to 2.0 parts by weight of the adhesive of a silylamine selected from the group whose formula is $$H_2N-(CH_2)_n-Si-(R)_3$$

wherein $n$ is a whole number from 1 to 5 and each R is selected from the group consisting of alkoxy radicals containing from 1 to 4 carbon atoms.

12. The method of claim 11 wherein the silylamine is triethoxysilylpropylamine.

13. The method of claim 11 wherein the silylamine is diethoxymethylsilylbutylamine.

References Cited in the file of this patent

UNITED STATES PATENTS

| | | |
|---|---|---|
| 2,409,759 | Hosking | Oct. 22, 1946 |
| 2,557,802 | Sommer | June 19, 1951 |
| 2,575,265 | Fiedler et al. | Nov. 13, 1951 |
| 2,581,926 | Groten et al. | Jan. 8, 1952 |
| 2,754,311 | Elliott | July 10, 1956 |
| 2,832,754 | Jex et al. | Apr. 29, 1958 |
| 2,876,207 | Henderson | Mar. 3, 1959 |
| 2,902,389 | Keil | Sept. 1, 1959 |